United States Patent
Takaoka (10) Patent No.: US 8,659,774 B2
(45) Date of Patent: Feb. 25, 2014

(54) INFORMATION PROCESSING APPARATUS, INFORMATION PROCESSING SYSTEM, AND COMPUTER-READABLE MEDIUM

(75) Inventor: Satoshi Takaoka, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 634 days.

(21) Appl. No.: 12/890,160

(22) Filed: Sep. 24, 2010

(65) Prior Publication Data

US 2011/0228318 A1 Sep. 22, 2011

(30) Foreign Application Priority Data

Mar. 18, 2010 (JP) ................................. 2010-062384

(51) Int. Cl.
*G06F 3/12* (2006.01)
*G06K 15/00* (2006.01)
*G06F 17/00* (2006.01)

(52) U.S. Cl.
USPC ....... 358/1.15; 358/1.13; 358/1.14; 358/1.16; 358/1.17; 715/221; 715/234

(58) Field of Classification Search
None
See application file for complete search history.

(56) References Cited

U.S. PATENT DOCUMENTS

| 2007/0109578 | A1  | 5/2007 | Suzue |
| 2009/0113285 | A1* | 4/2009 | Ishii ............................... 715/221 |
| 2011/0085195 | A1* | 4/2011 | Tsuchiya ...................... 358/1.14 |
| 2011/0167500 | A1* | 7/2011 | Ootaki ............................ 726/28 |
| 2011/0176169 | A1* | 7/2011 | Kashioka ..................... 358/1.15 |
| 2011/0179348 | A1* | 7/2011 | Kuroyanagi .................. 715/234 |
| 2013/0208291 | A1* | 8/2013 | Ikeda ........................... 358/1.13 |

FOREIGN PATENT DOCUMENTS

| JP | 2004-287882 A | 10/2004 |
| JP | 2005-266954 A | 9/2005 |
| JP | 2007-140758 A | 6/2007 |
| JP | 2008-040537 A | 2/2008 |
| JP | 2009-104453 A | 5/2009 |

OTHER PUBLICATIONS

Communication from the Japanese Patent Office dated Nov. 7, 2013, in a counterpart Japanese application No. 2010-062384.

* cited by examiner

*Primary Examiner* — Satwant Singh
(74) *Attorney, Agent, or Firm* — Sughrue Mion, PLLC (57) ABSTRACT

A web page of a server placed on a network and the operation description of a browser by an operation terminal for the web page are stored and the operation description is played back (repeated), whereby the same operation as the previous browser operation is executed in the operation terminal. At this time, various types of operation are recorded and are repeated by software, so that the user need not perform the same various types of operation as those previously performed.

8 Claims, 13 Drawing Sheets

| PLAYBACK NUMBER | PAGE INFORMATION | OPERATION INFORMATION 1 | ... | OPERATION INFORMATION N | PAGE INFORMATION |
|---|---|---|---|---|---|

PAGE INFORMATION

| TYPE | | | |
|---|---|---|---|
| BROWSER | URL | TITLE | EXPIRATION | EFFECTIVE/ INEFFECTIVE |
| DEVICE | PAGE NUMBER | | |

OPERATION INFORMATION

| TYPE | | | |
|---|---|---|---|
| LINK OPERATION | URL | TRANSMISSION INFORMATION | |
| DEVICE | PAGE NUMBER | TRANSMISSION INFORMATION | |
| SCROLL OPERATION | MOVE VALUE | | |
| INPUT OPERATION | INPUT VALUE | EFFECTIVE/ INEFFECTIVE | |
| DEVICE OPERATION | X, Y COORDINATES | | |

ERROR SCREEN

ERROR

SINCE RECODED PAGE AND DISPLAY PAGE DIFFER, PLAYBACK (REPRODUCTION) IS STOPPED.

INFORMATION PROCESSING APPARATUS, INFORMATION PROCESSING SYSTEM, AND COMPUTER-READABLE MEDIUM

CROSS-REFERENCE TO RELATED APPLICATION

This application is based on and claims priority under 35 USC 119 from Japanese Patent Application No. 2010-062384 filed on Mar. 18, 2010.

BACKGROUND

Technical Field

This invention relates to an information processing apparatus, an information processing system, and a computer-readable medium.

SUMMARY

According to an aspect of the invention, an information processing apparatus includes a display control unit, a display information acquisition unit, a display description determination unit, an operation determination unit, a record unit, a comparison unit and a record description execution unit. The display control unit controls display on a display unit. The display information acquisition unit acquires information transmitted from a connection party connected through a communication line. The information is displayed on the display unit. The display description determination unit determines description displayed on the display unit. The operation determination unit determines operation performed for the description displayed on the display unit. The operation contains operation of giving an information transmission command to the connection party. The record unit records record description which includes both the descriptions determined by the display description determination unit and the operation determined by the operation determination unit. The comparison unit makes a comparison between the record description recorded by the record unit and the information acquired by the display information acquisition unit. The record description execution unit executes the record description recorded in the record unit based on a comparison result of the comparison unit.

BRIEF DESCRIPTION OF THE DRAWINGS

Exemplary embodiments of the invention will be described in detail based on the following figures, wherein.

DETAILED DESCRIPTION

An example using the invention will be discussed below: First, used terms will be discussed. A browser (or web browser) is software for viewing a web page. The web page is display description made up of data of a document, layout information, an image, a moving image, etc., on public view on the Internet.

Figure 1:
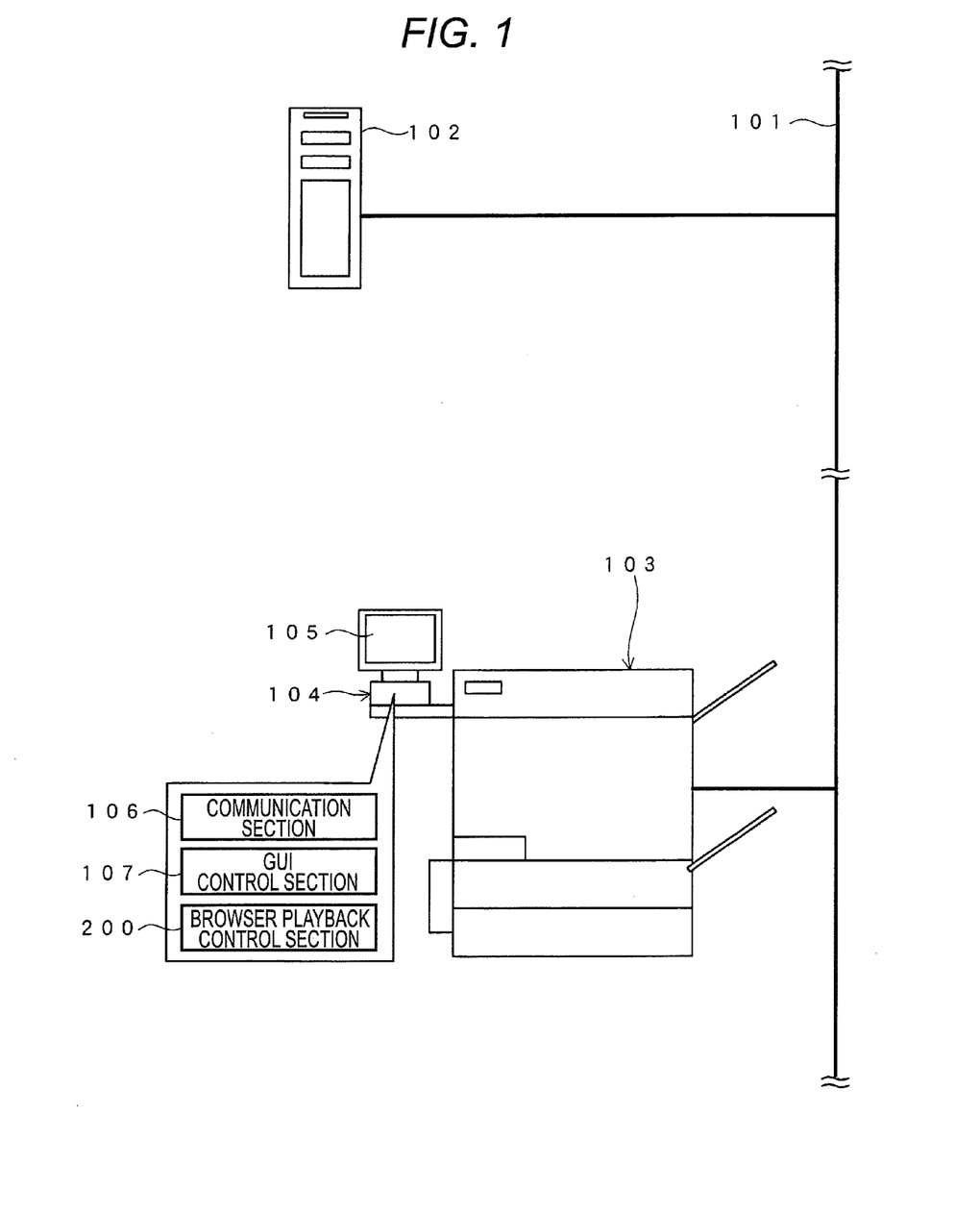
FIG. 1 is a conceptual drawing to show an example of a system using the invention.

FIG. 1 shows an example of a system incorporating the invention. FIG. 1 shows an Internet line. A server 102 and a printer 103 are connected to the Internet line 101. The server 102 and the printer are positioned at remote locations. The printer 103 includes an operation terminal 104 functioning as a computer. The operation terminal 104 is a terminal for performing operation for operating the printer 103 and can access the server 102 and can perform various types of operation using the browser. For example, the user can operate the operation terminal 104 to access the server 102, can view a web page managed in the server, can perform various types of operation for the web page, can download data from the web page, and can print out it on the printer 103. The printer 103 includes a FAX function and a copy function.

A specific example will be discussed below: For example, it is assumed that the server 102 is placed in the head office of a travel agency and the printer 103 is placed in a business office of the travel agency. If a staff member of the business office wants to present a travel plane of one region based on the demand of a customer visiting the business office, the staff member operates the operation terminal 104 to access the server 102. The staff member downloads the material relevant to the travel plane from a web page managed in the server 102 to the operation terminal 104 and prints out it on the printer 103. The staff member presents the printed-out material to the customer visiting the business office and explains the travel plane. The system shown in FIG. 1 is used in such a situation by way of example.

The operation terminal 104 includes the function as a computer and a touch panel display 105 and enables the user to perform various types of operation. The operation terminal 104 includes a communication section 106, a GUI (graphical user interface) control section 107, and a browser playback control section 200. The communication section 106 is a function section for connecting to the Internet line 101 and has the same function as an Internet connection function included by an ordinary personal computer. The GUI control section 107 provides an interface environment for performing various types of operating using a touch panel display 105. Viewing software for viewing a browser on the Internet is installed in the operation terminal 104.

Figure 2:
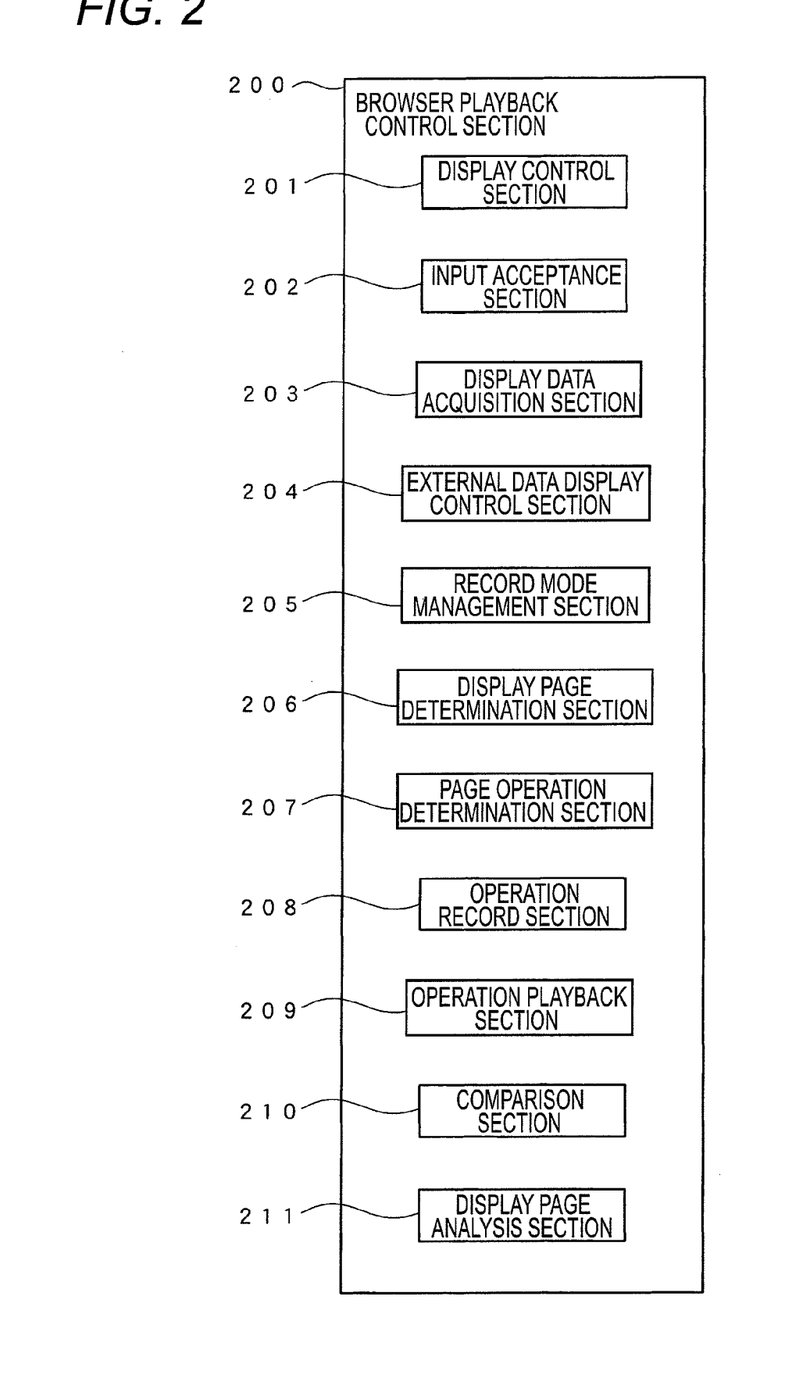
FIG. 2 is a block diagram of an embodiment of the invention.

The browser playback control section 200 has a mode of starting record of browser operation, a mode of terminating record of browser operation, and a mode of reproducing operation record. The browser playback control section 200 has a unit which stores information for determining a display page of the browser displayed from the record start to the termination and operation required for page transition of display pages (example: The operation required for page transition is like operation, form operation, URL setting in a location object, etc.) or page operation (scroll, button operation, etc.).

The browser playback control section 200 performs operation of playing back operation in accordance with operation storage if the display page of the browser stored at the operation playback time and the current display page match and terminating the playback mode at the termination stage of stored last display page operation. If transition of recorded display pages and the actual display page differ, the browser playback control section 200 displays an error screen and stops playback. If no setup information is transmitted to web server accompanying page transition, the browser playback control section 200 has a playback mode of skipping the page.

If transition of display pages and the actual display page differ, the browser playback control section 200 has a playback mode of analyzing the actual display page and converting to operation of the actual display page and reproducing the page if it is determined that the page can be reproduced. The browser playback control section 200 has a playback mode of omitting screen display between the playback (reproduction) start page to the last page. The browser playback control section 200 has a playback mode of omitting screen display between the playback (reproduction) start page to the last page and displaying a screen displaying the playback state (what screen is being played back, etc.). The browser playback control section 200 is provided with a unit which determines the expiration date of a page and has a function of displaying an error screen and stopping playback (reproduction) if the expiration date of the display page is over.

The browser playback control section 200 can set storage or no storage of input information of a key and a virtual keyboard during input of an operation page. For a page where an input value is not stored or played back (reproduced), screen transition is terminated or after interruption, a mode of continuing playback (reproduction) from the next page is switched. The operation records also contain screen operation for the internal function of the operation terminal 104 in addition to operation of the web browser. In the example, the internal function of the operation terminal 104 is a function of operating the printer 103. That is, in addition to the operation description of the browser for a web page managed in the server 102, the description of operation of the printer 103 by operating the touch panel display 105 is also recorded and the recorded operation description can be played back (repeated).

The browser playback control section 200 will be discussed below in detail: The browser playback control section 200 is implemented as software in the operation terminal 104 functioning as a computer. The browser playback control section 200 includes a display control section 201, an input acceptance section 202, a display data acquisition section 203, an external data display control section 204, a record mode management section 205, a display page determination section 206, a page operation determination section 207, an operation record section 208, an operation playback section 209, a comparison section 210, and a display page analysis section 211. One or two or more of the function sections can also be implemented as dedicated hardware.

The display control section 201 controls the description displayed on the touch panel display 105. The input acceptance section 202 accepts the operation description for the touch panel display 105. The display data acquisition section 203 acquires display data of the description obtained from the server 102 and displayed on the touch panel display 105 (data of a web page). The external data display control section 204 displays the web page managed in the server 102 on the touch panel display 105 based on display data acquired by the display data acquisition section 203.

The record mode management section 205 manages the start, termination, and playback (reproduction) of an operation record. The display page determination section 206 determines the description of a web page displayed on the touch panel display 105 and managed in the server 102. The page operation determination section 207 determines the description of operation for the description of a web page displayed on the touch panel display 105 and managed in the server 102 (operation by operating the touch panel display). The operation record section 208 stores the information determined by the display page determination section 206 and the page operation determination section 207. This is, the description of operation for a web page in the server 102 by operating the browser in the operation terminal 104 and the display description also containing the transition on the display 105 at the time are recorded in the operation record section 208. In addition, the description of operation for the printer 103 is also recorded in the operation record section 208.

If the display page determined by the display page determination section 206 during operation playback (display page of web page in the server 102 acquired at the point in time) and the display page held by the operation record section 208 match, the operation playback section 209 executes page operation held by the operation record section 208 (operation using the record touch panel display). The comparison section 210 is a function section for performing processing at step S803 in FIG. 8 described later; it makes a comparison between page information recorded for playback (reproduction) and page information acquired from the server 102 at the point in time and determines whether or not they match. If the display page determined by the display page determination section 206 during operation playback and the display page held by the operation record section 208 do not match, the display page analysis section 211 analyzes the display page acquired from the server 102 at the point in time. If the display page analysis section 211 determines that the display page cannot be played back (reproduced), it displays a message to the effect that the display page cannot be played back (reproduced) on the touch panel display 105; if the display page analysis section 211 determines that the display page can be played back (reproduced), playback (reproduction) is continued.

Figure 3:
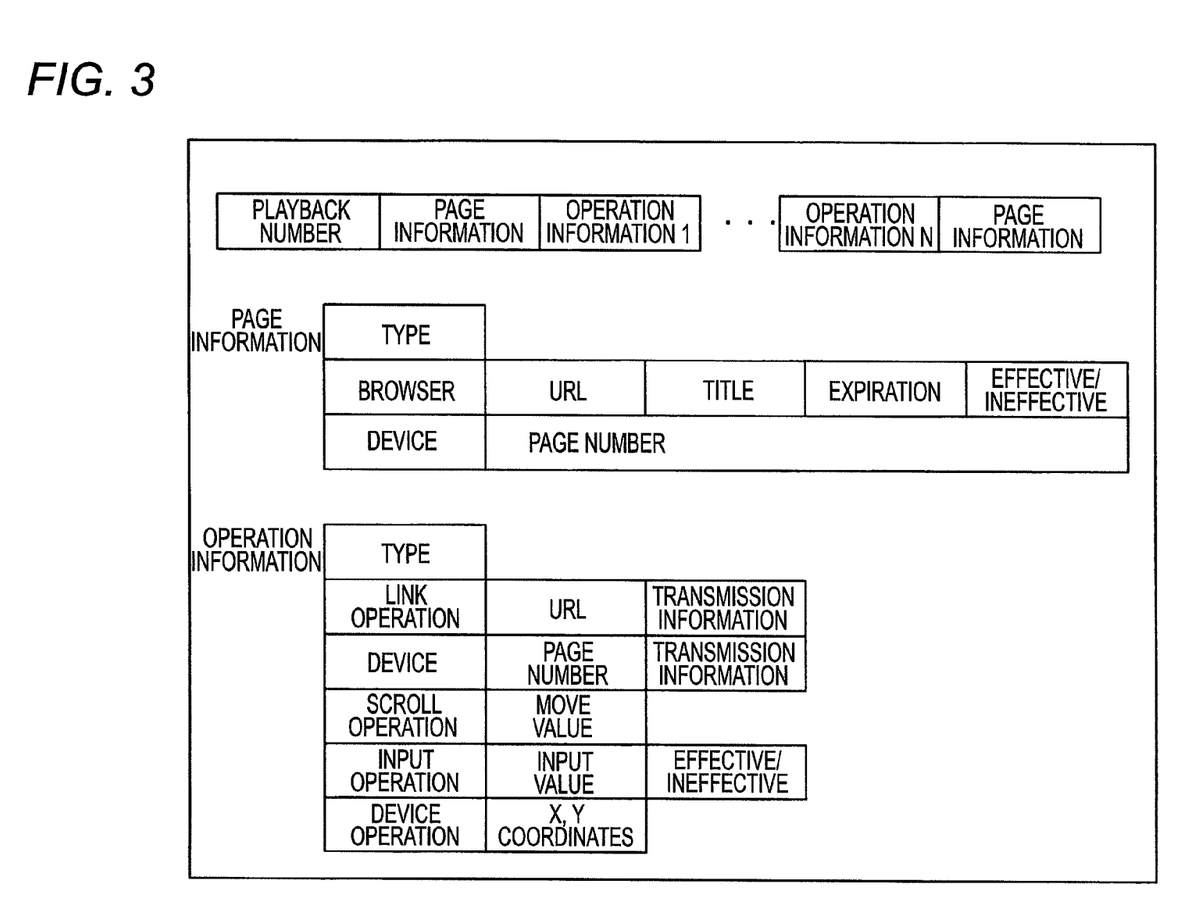
FIG. 3 is a conceptual drawing to show the description of recorded information.
Figure 4:
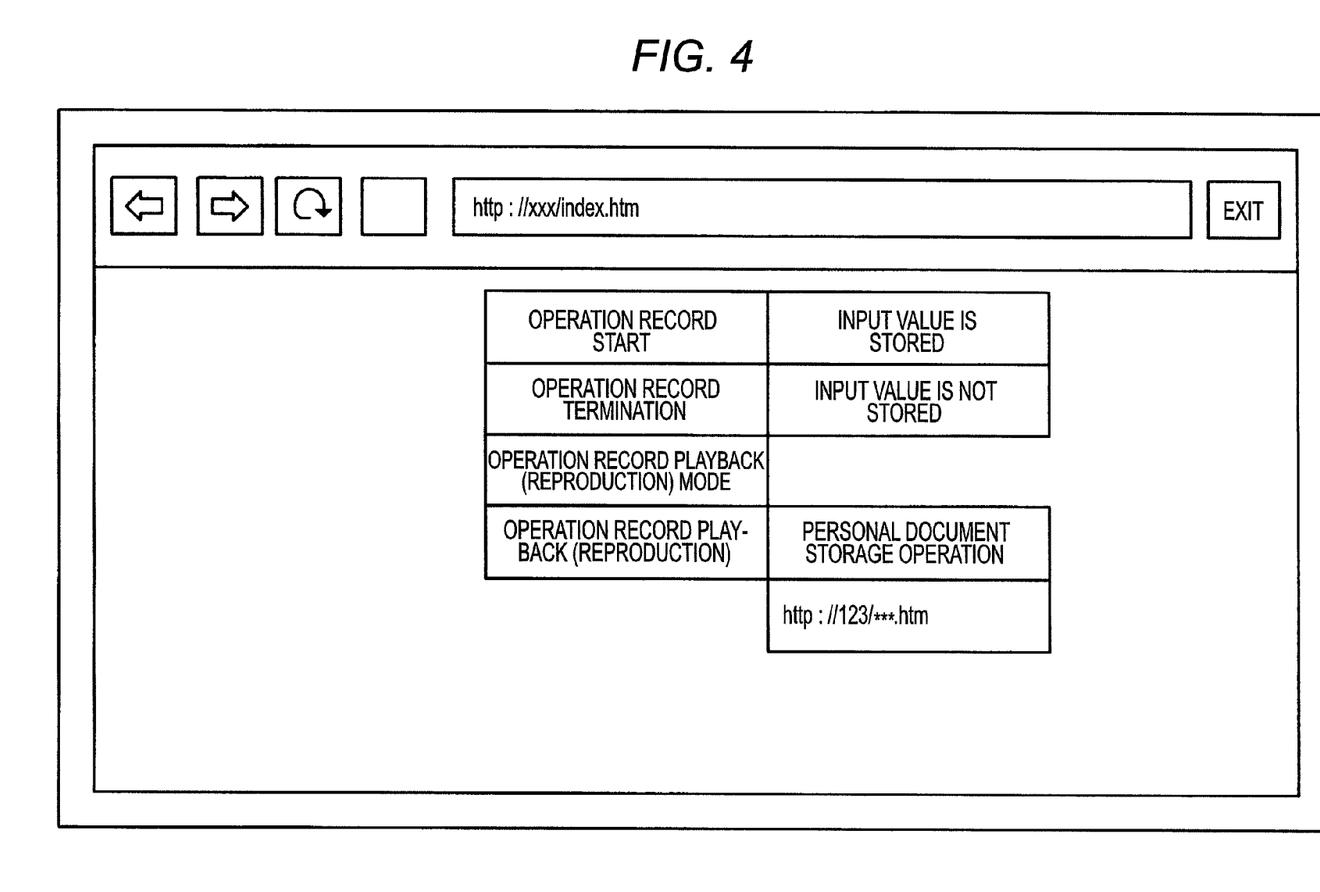
FIG. 4 shows an example of screen display of a browser.
Figure 5:
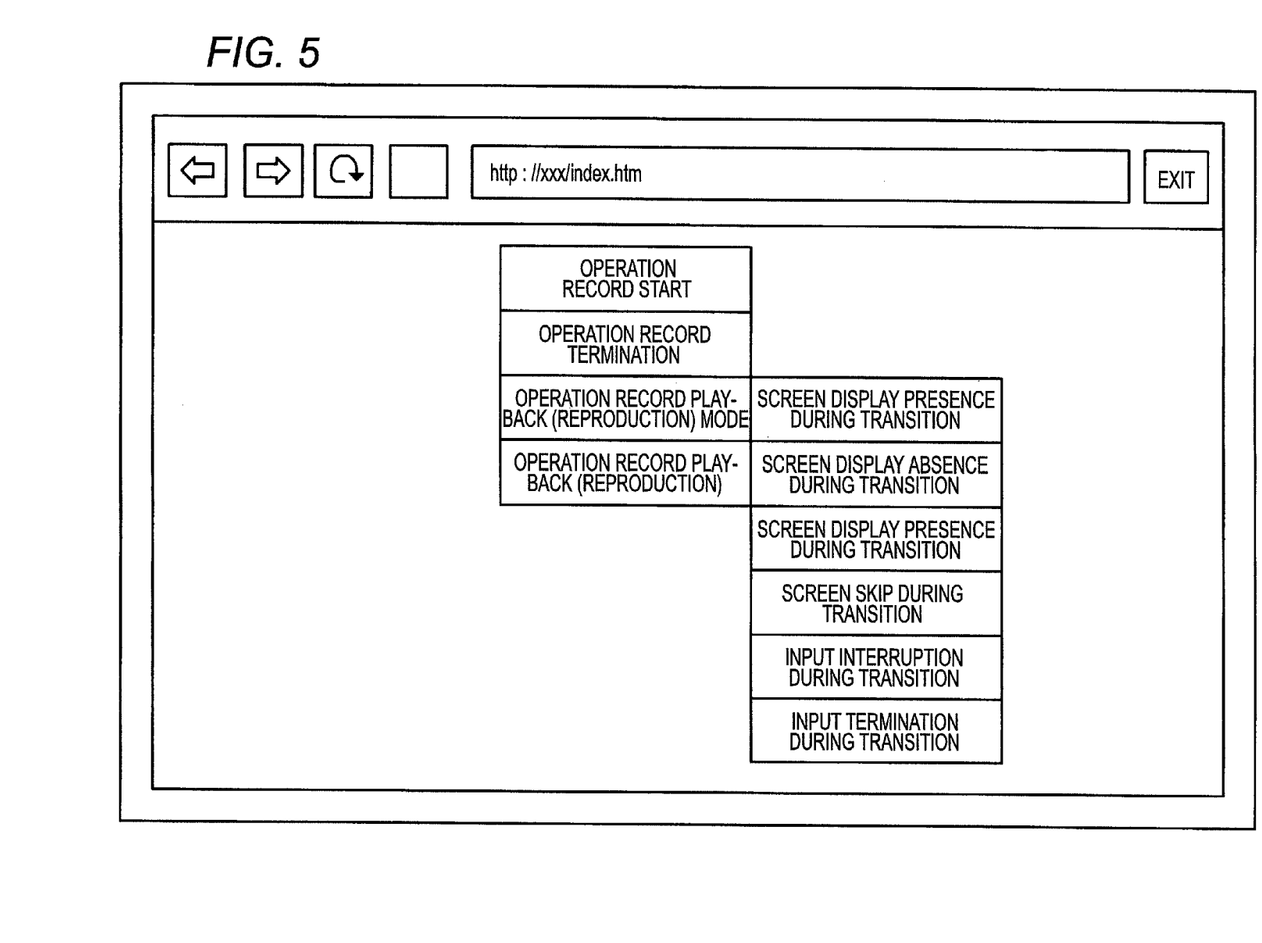
FIG. 5 shows an example of screen display of the browser.

FIG. 3 shows an outline of record information recorded in the operation record section 208. FIGS. 4 and 5 show screen examples at the execution time of the web browser. The examples are screen examples of the touch panel display 105 in a state in which the server 102 specified by URL (Uniform Resource Locator) of http://xxx/index.htm is accessed and an HTML (HeyperText Markup Language) file of display data of a web page is acquired from the server 102.

In FIG. 4, displayed upper buttons are an operation section of the browser. A plurality of buttons of "operation record start," etc., are displayed on the screen of the browser in an overlap manner. A display screen of a web page managed in the server 102 is displayed behind the plurality of buttons of "operation record start," etc., but is not shown in FIG. 4 or 5. In the example, any of these buttons is selected, whereby any of operation record start of starting record processing of the description of operation for the browser, operation record termination of terminating record of the operation, operation record playback (reproduction) mode of making various settings to record operation, or operation record playback of playing back (reproducing) record of the recorded operation can be selected as a submenu. At the operation record start time, further, storage or no storage of an input value can be selected. In the operation record playback (reproduction) mode, further, screen display presence during transition, screen display absence during transition, state display presence during transition, screen skip during transition, input interruption during transition, or input termination during transition can be selected as shown in FIG. 5.

In the operation record playback (reproduction), further a registered operation record name is displayed. The operation record name displayed here is either URL of page information of record information described in FIG. 3 or a title. Personal document storage operation of storing data in a specific URL can also be selected.

Figure 6:
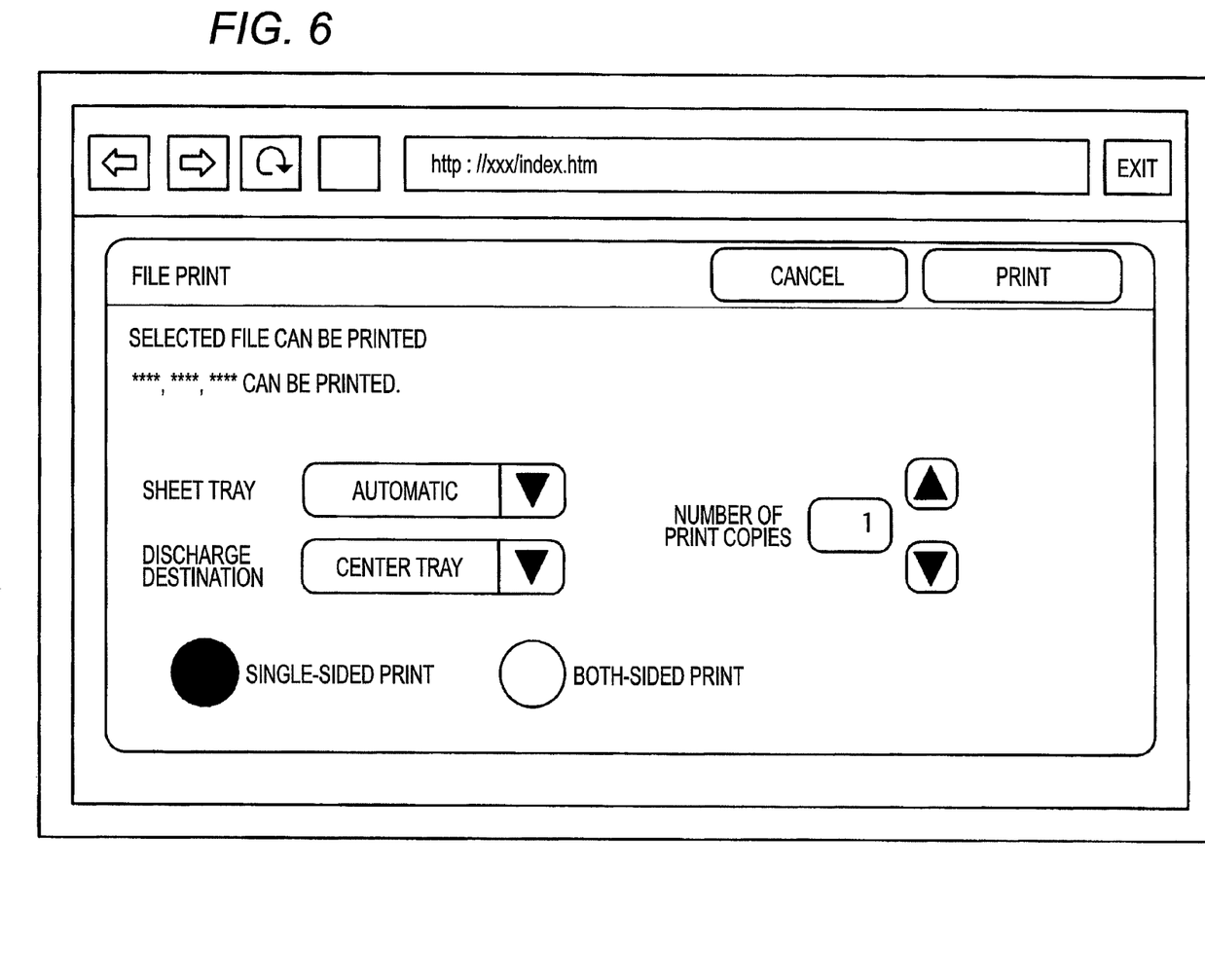
FIG. 6 shows an example of screen display of a display of an operation terminal.

The recorded operation description also contains the display description and the operation description of an operation screen of the printer 103. An example is shown in FIG. 6. FIG. 6 shows an example of description displayed on the touch panel display 105 when a print operation command is given to the printer 103. The operation description for the printer 103 as shown in FIG. 6 (for example, various print conditions) is also recorded as an operation record and can be played back (reproduced). Accordingly, for example, operation of an example such as access to a web page managed in the server 102 by operating the operation terminal 104, display of a specific page in the web page by operating the browser, or print of the specific page on the printer 103 is recorded and processing of the example can be repeated based on the record.

An example of operation will be discussed. Processing in flowcharts shown in FIGS. 7 to 11 described below is executed in the operation terminal 104 in accordance with an operation program recorded in the operation terminal 104 in FIG. 1. The operation program may be recorded in an appropriate record medium and may be provided for the operation terminal 104 from the record medium.

Figure 7:
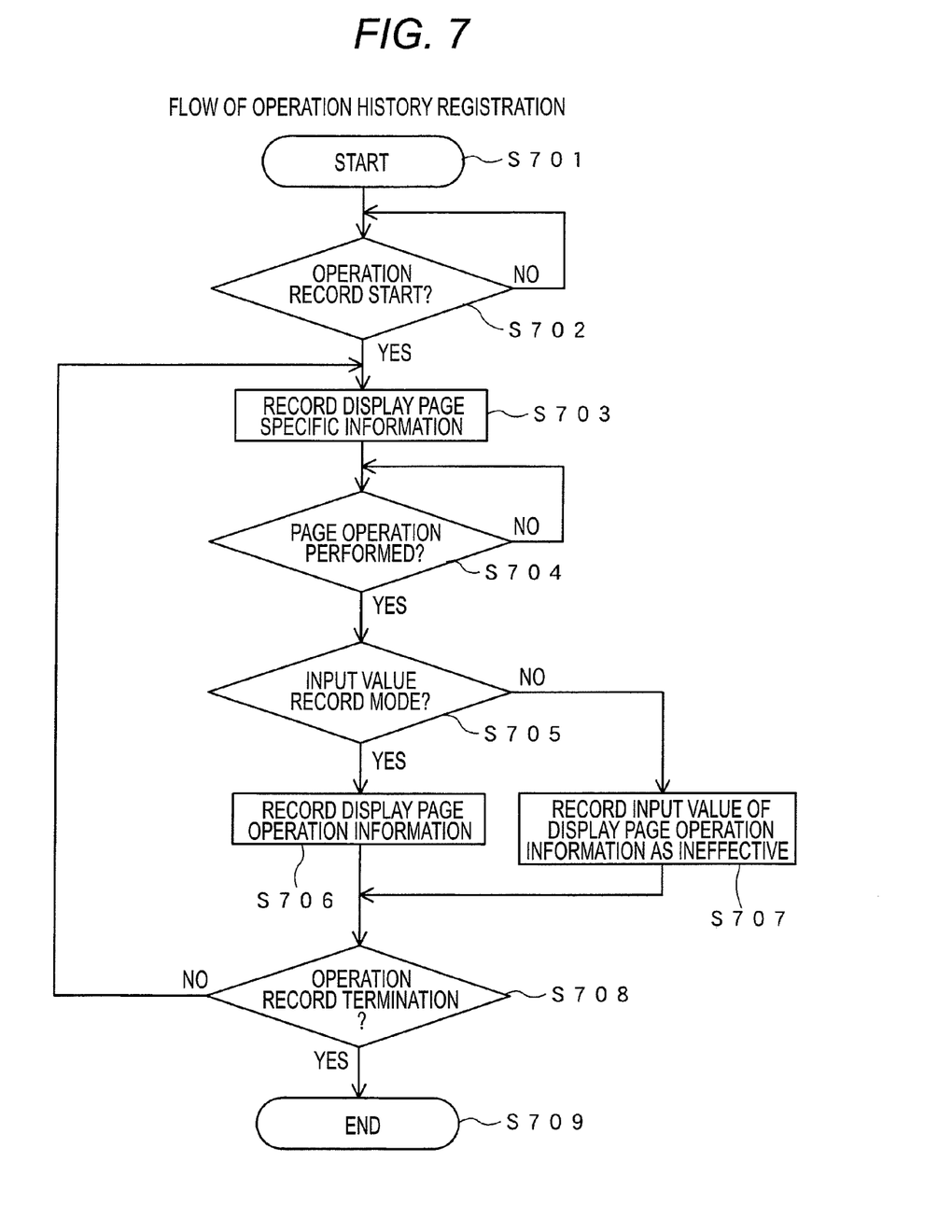
FIG. 7 is a flowchart to show an example of the operation of the embodiment of the invention.

FIG. 7 shows a processing flow from the operation record start to the termination. In the description to follow, it is assumed that the user operates the operation terminal 104 to access the server 102 and performs various types of operation in a web page on the server 102. In the state, when the server 102 is accessed and a web page of the server 102 is opened, processing is started (step S701) and the screen in FIG. 4 is displayed on the touch panel display 105.

Here, if operation record start in FIG. 4 is selected, the determination at step S702 becomes YES and the page information in FIG. 3 is recorded for the current displayed page (step S703). Here, as the type, either the display page of the browser or a display page of a device of an internal screen of the operation terminal 104 (for example, screen in FIG. 6) is registered.

At the time, if type=browser, URL is URL when the display page is acquired, and http://xxx/index.htm is recorded. As the title, the character string specified in <TITLE> tag of HTML of the display page is recorded. As the expiration, the expiration date of the display page indicated by the server 102 in Express field of HTTP (HyperText Transfer Protocol) of communication protocol for acquiring a display page from the server 102 or <META> tag. If no-cache is specified in Cache-Control of HTTP, the browser is prohibited from holding the display page and thus effective/ineffective information is recorded as ineffective; otherwise, effective/ineffective information is recorded as effective. If type=device, the page number (uniquely identifiable number) of the internal screen of the operation terminal 104 (an example is screen display in FIG. 6).

Next, if page operation (operation of switching a display screen of a web page) is performed, the process goes from step S704 to S705. If the mode is a mode of recording the input value, the process goes to step S706; if the mode is a mode of not recording the input value, the process goes to step S707. At step S706 and S707, operation record is performed. That is, at step S706, the description of operation for the browser using the operation terminal 104 is recorded. If the type is scroll bar operation, the move amount of the scroll bar is recorded. If the type is input information of a character or a numeric value, the input value is recorded as input operation. If the mode of not storing the input mode is specified (step S707) at the operation record start time, information indicating that the input value is ineffective is recorded. If page information type=device, operation coordinates on the screen (namely, information as to button display at what position is pressed) are recorded. When page information type=browser, if a link specified by <A> tag, etc., is operated, information transmitted to the server and URL are recorded as a result. If button operation of <FORM> tag, etc., is performed, information transmitted to the server and URL are recorded as a result. If the operation record is terminated, the process goes from step S708 to S709 and the processing is terminated. If the operation record is not terminated, processing at step S703 and the later steps is repeated.

Figure 8:
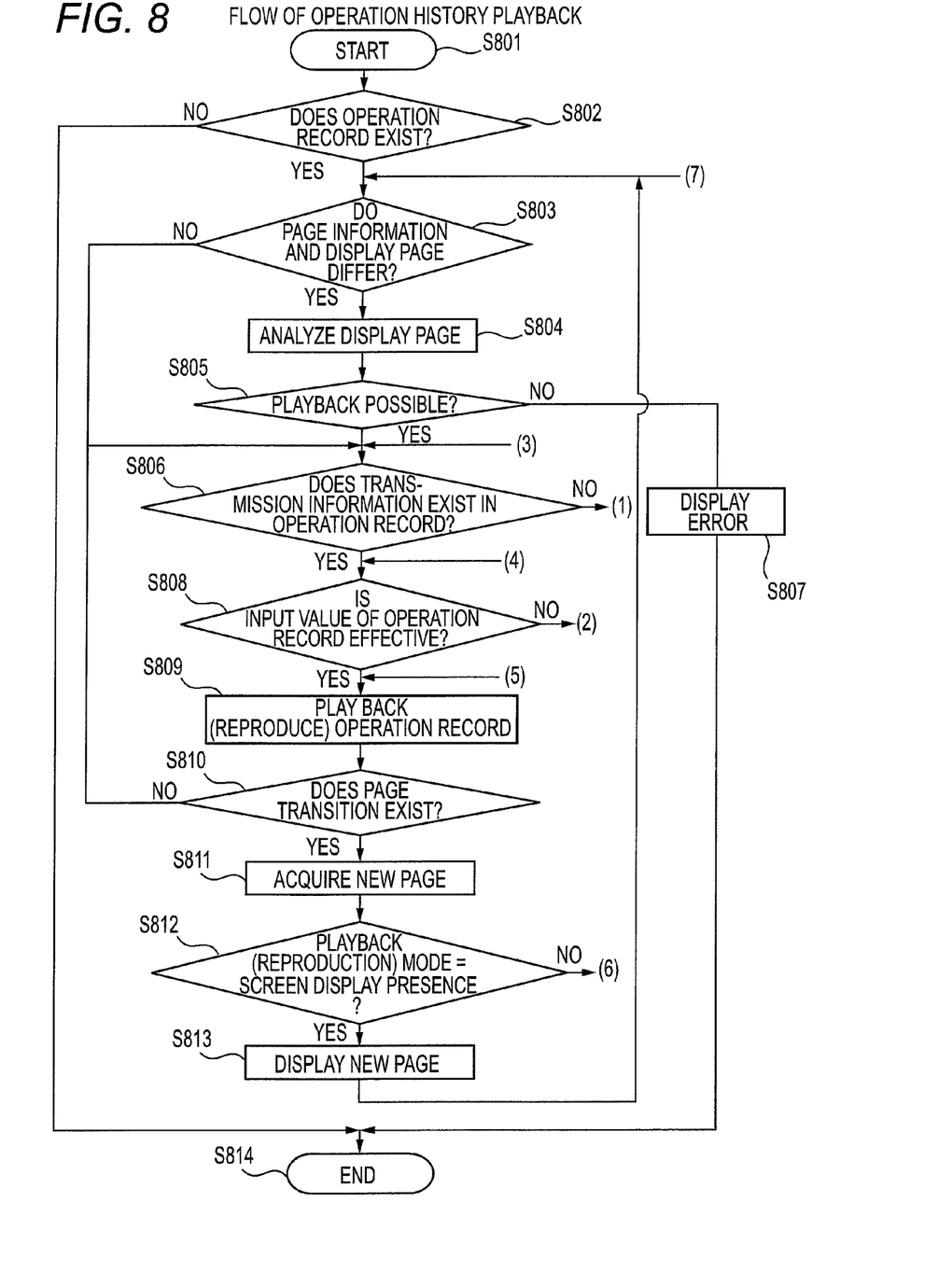
FIG. 8 is a flowchart to show an example of the operation of the embodiment of the invention.

An example of processing of playing back (repeating) the description of the operation record performed according to the procedure in FIG. 7 will be discussed below: FIG. 8 shows a processing flow when the operation record is played back (reproduced). When an operation record playback (reproduction) command is given, the processing is started (step S801) and the presence or absence of operation record is determined (step S802). If operation record does not exist, the processing is terminated (step S814); if operation record exists, the process goes to step S803.

At step S803, when page information type=browser, whether or not URL is the same is determined from the current display page and page information of specified operation record and if title information is recorded, whether or not the information is the same is determined. In this case, whether or not the description of the screen displayed at the point in time is the same as the recorded screen description is determined, and sameness may be able to be determined. Therefore, the determination can be executed using a part of image data, a part of control data, and a part of target data of attendant data, etc., in addition to the URL and the title described above.

As a result, if the comparison information differs, the description of the display page is analyzed (step S804) and whether or not the recorded operation description can be played back (executed) if the display description is display description of different web page is determined (step S805). If the comparison result is the same in the determination at step S803, the process goes to step S806 described later.

Figure 12:
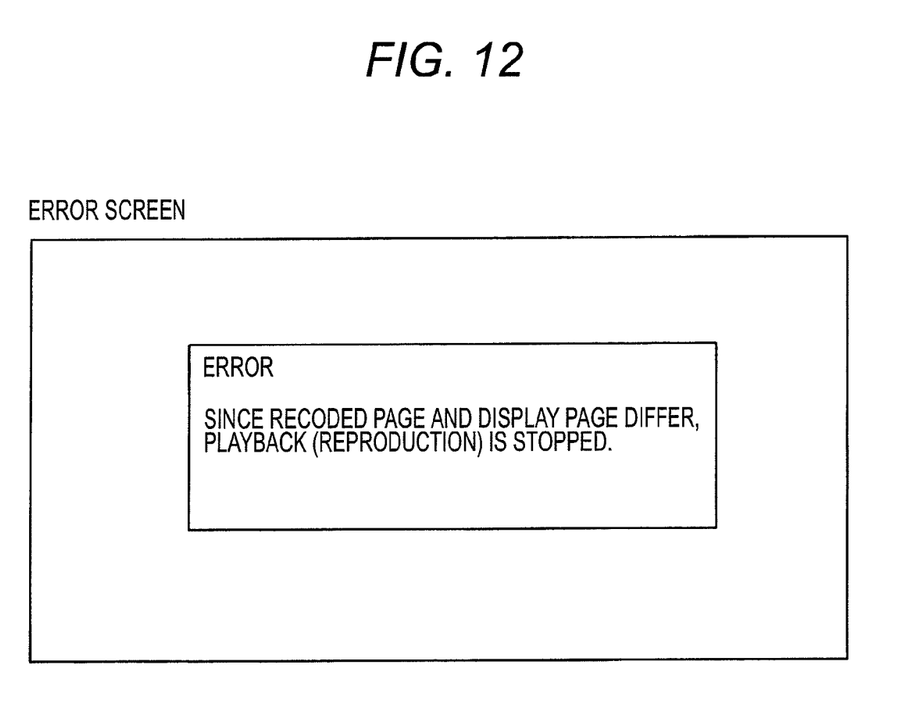
FIG. 12 shows an example of screen display of the display of the operation terminal.

At step S805, if the URL is the same and the same description is contained, it is determined that playback (reproduction) is possible. If playback (reproduction) is impossible, an error screen (FIG. 12) is displayed (step S807) and the processing is terminated. If playback (reproduction) is possible, the presence or absence of transmission information in the operation record is determined. If transmission information exists, the process goes to step S808; if transmission information does not exist, the process goes to processing in FIG. 9.

At step S808, whether or not the input value of the operation record (for example, record of input of a digit or a character) is effective is determined. If the input value is effective, the operation record is played back (reproduced) (step S809). Based on the data recording the description of browser operation for the operation terminal 104 performed in the flow in FIG. 7, processing of repeating the operation (again executed processing) is performed at step S809.

The processing at step S809 will be discussed. In this case, if page information type=device, a comparison is made between the page number of the display screen and the recorded page number is made. If the page numbers are the same, scroll operation or device operation is performed in accordance with the operation information. If page information type=browser, operation description of link, button operation is transmitted to recorded URL in accordance with the operation information together with any other transmission information if necessary. If operation is ordinary link operation, GET http://xxx/aaa/a.htm, etc., of HTTP is sent to the server 102; if operation is operation of a form button, etc., transmission information of name=value, etc., to POST http://xxx/aaa/a.htm of HTTP is sent to the server 102.

The processing at step S809 is performed, whereby recorded browser operation (further if necessary, device operation (operation of the printer 103)) is repeated. At this time, button operation, etc., is executed by software in accordance with the operation record, so that the user need not again perform performed at the operation record time. For the processing of playing back (reproducing) the operation record, an HTML file is returned from the server 102 to the operation terminal 104 and the contents of the file are displayed on the touch panel display 105. In association with this, operation for the printer 103 is also repeated. For example, print processing of a display screen of a web page of the server 102 performed at the operation record time is repeated.

Figure 13:
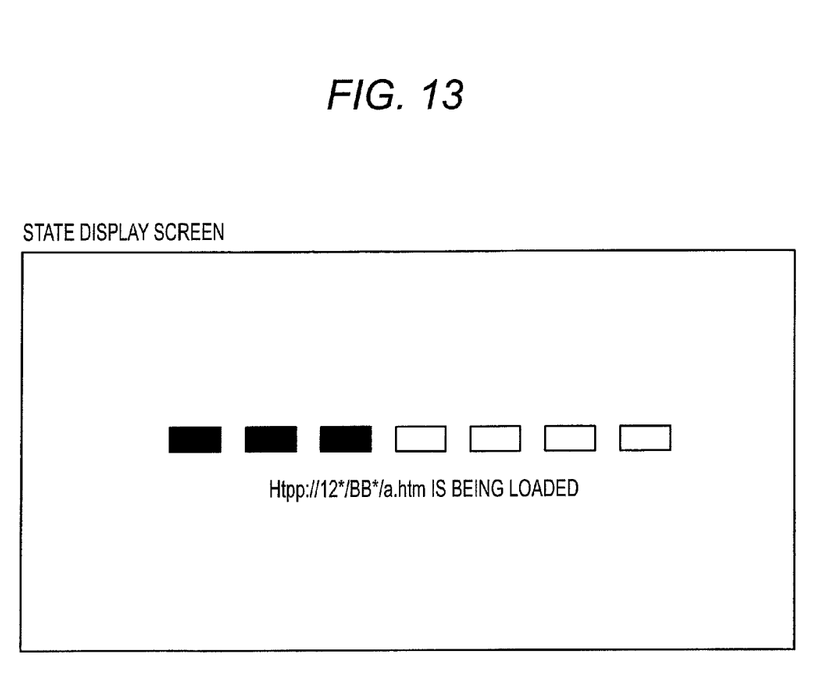
FIG. 13 shows an example of screen display of the display of the operation terminal.

If the operation record playback (reproduction) mode is screen display absence during transition, the returned HTML file is only interpreted and screen display is executed only when later operation record does not exist. If the operation record playback (reproduction) mode is state display presence during transition, progress bar and URL character string only are displayed on the screen (FIG. 13).

Next, determination at step S810 is executed and if page transition (for example, switch to another page) exists, the process goes to step S811; if no page transition exists, processing at step S806 and the later steps is repeated. At step S811, a new page is acquired and if "playback (reproduction) mode=screen display presence" is set, the acquired new page is displayed (step S813) and processing at step S803 and the later steps is repeated.

Figure 9:
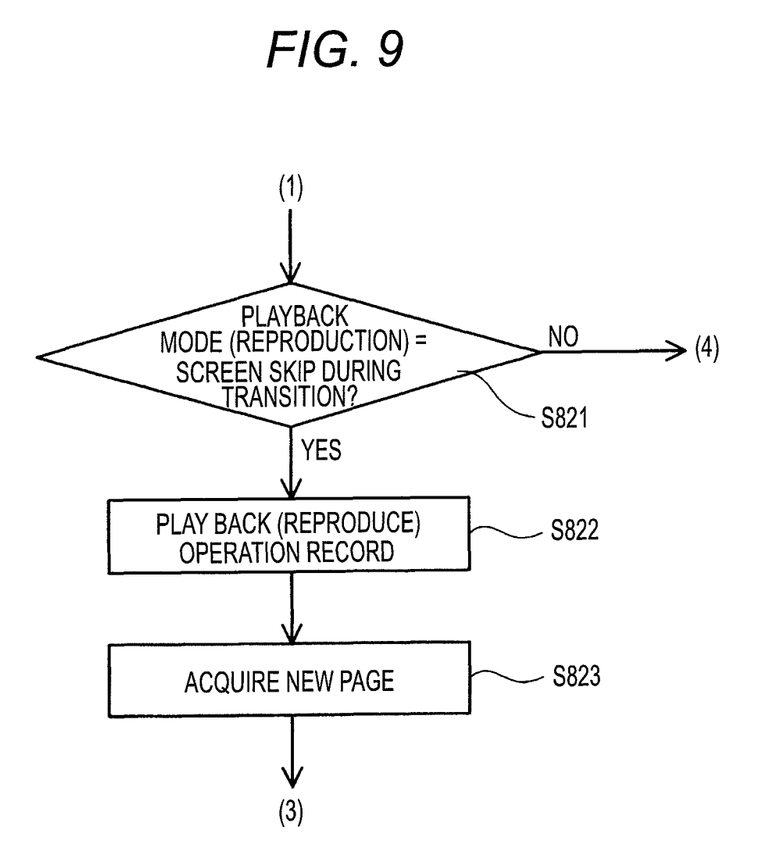
FIG. 9 is a flowchart to show an example of the operation of the embodiment of the invention.

It is determined at step S806 that transmission information does not exist in the operation record, the process goes to processing in FIG. 9. In this case, determination at step S821 is executed and if "playback (reproduction) mode=screen skip during transition" is set, the operation record is played back (reproduced) (step S822) and new page is acquired (step S823) and the processing at step S806 and the later steps in FIG. 8 is executed. If determination at step S821 is NO, the process goes to processing at step S808 and the later steps in FIG. 8.

If the operation record playback (reproduction) mode is screen skip during transition, button or link operation containing no transmission information is not displayed on the screen until operation involving transmission operation of recorded operation information, whereby intermediate screen transition can be skipped.

Figure 10:
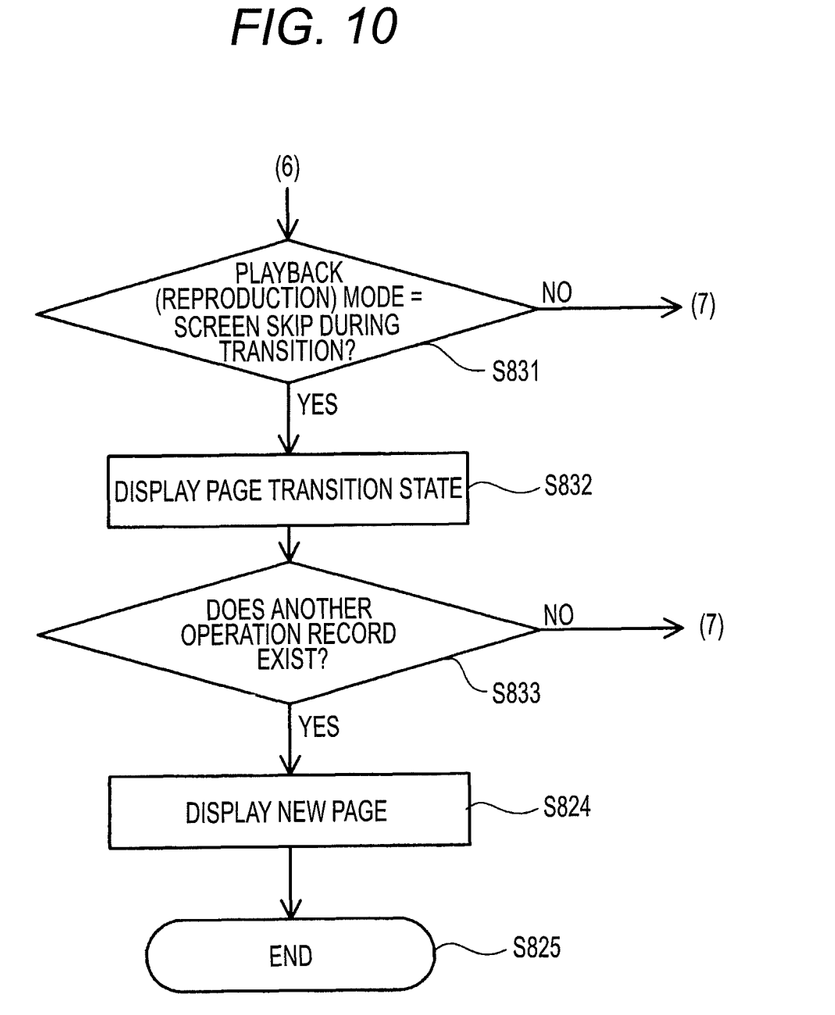
FIG. 10 is a flowchart to show an example of the operation of the embodiment of the invention.
Figure 11:
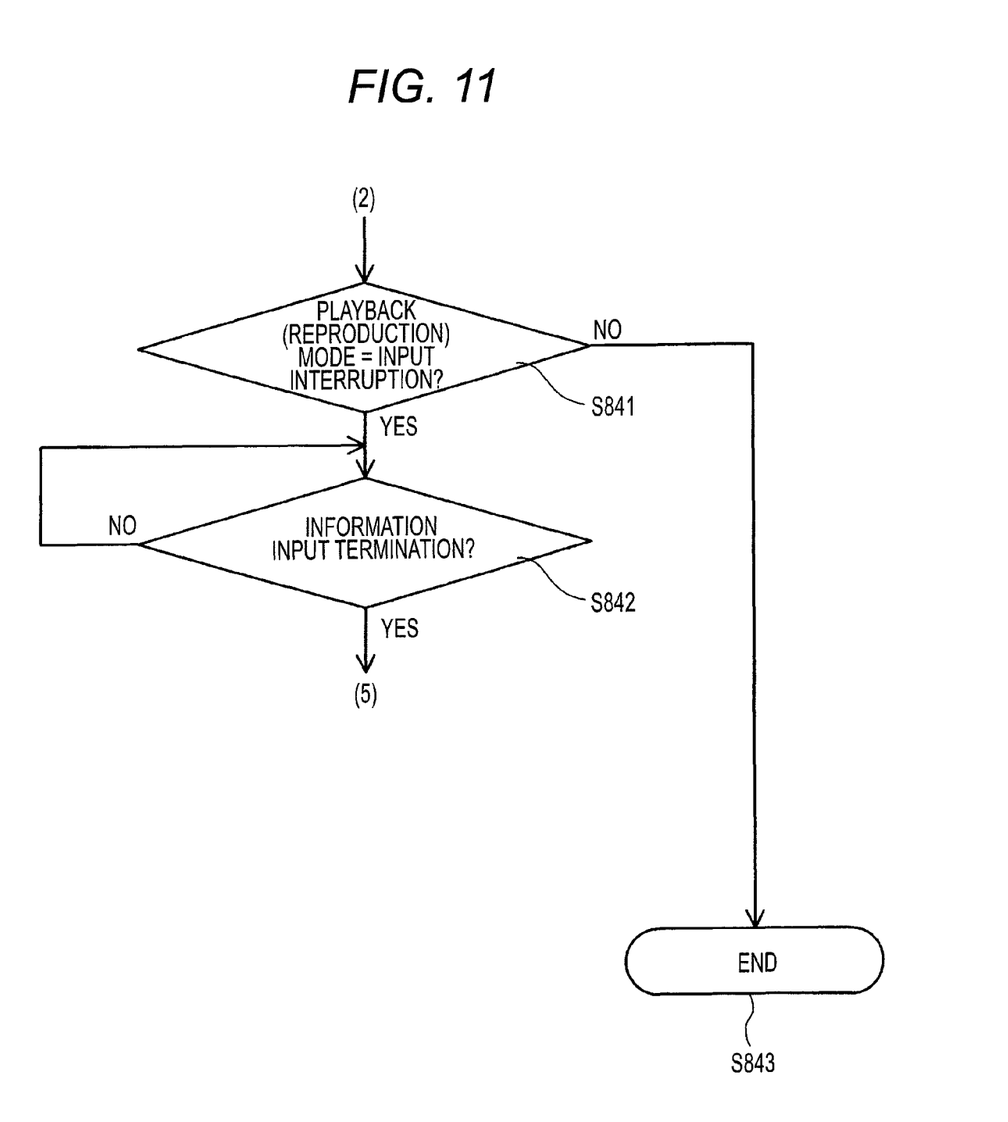
FIG. 11 is a flowchart to show an example of the operation of the embodiment of the invention.

If step S808 is NO, the process goes to processing in FIG. 11. Here, if the operation record playback (reproduction) mode is input termination during transition, playback (reproduction) can be stopped at the point in time at which recorded operation information is input (step S841). If the playback (reproduction) mode is input interruption during transition, the process waits until input terminates (step S842) at the point in time at which recorded operation information is input. When the input terminates, the process goes to step S809 in FIG. 8 and record playback (reproduction) is continued. If step S812 is NO, the process goes to processing in FIG. 10 and the processing in FIG. 10 is executed.

According to the art described above, a web page of the server 102 placed on a network and the operation description of the browser by the operation terminal 104 for the web page are stored and the operation description is played back (repeated), whereby the same operation as the previous browser operation is executed in the operation terminal 104. At this time, various types of operation are recorded and are repeated by software, so that the user need not perform the same various types of operation as those previously performed. Thus, the burden on the user is lightened and a situation in which the operation terminal 104 is occupied for long hours for operation can be circumvented.

Such an operation mode is very significant for work in a place such as the business office of the travel agency described above by way of example. For example, to obtain the material of a travel plan of one specific region, it is considered that the user first accesses the server 102 and displays the web page and then displays the objective material on the operation terminal 104 by operating the browser and prints out the material on the printer 103.

In this case, to use the art of the embodiment, the user needs perform operation of the browser and operation of the printer 103 only once. Later, to print out the same material, the user may play back (reproduce) operation record for the browser and operation record for the printer 103. At this time, if an operation record playback (reproduction) command is given, the recorded operation is executed in sequence and the same material is printed out from the printer 103.

At this time, the user need not repeat the same operation of the browser or the same operation of the printer 103 as the first time and can allocate energy to serving a customer and any other work. This means that work by operating the browser and operation of the printer 103 associated with it can be stereotyped, so that efficiency of work can be enhanced. The superiority applies not only to the example of the travel agency described above, but also to various jobs that can be stereotyped. For example, work of obtaining various standard documents by using web pages, etc., can be stereotyped and efficiency of work can be accomplished.

If the description of an operation record and the description of an accessed web page do not match because of update of the description of the web page, the processing at step S804 and the later steps is performed, whereby browser operation can be played back if the difference is in a measure of range.

Playback display of display can be omitted in playback (reproduction) of an operation record, so that when operation for the browser may be repeated only, fruitless screen display can be suppressed.

A system wherein a part or all of the processing shown in FIGS. 7 to 11 is performed in any other device than the operation terminal 104 is also possible. In this case, the operation description of the operation terminal 104 is sent to another device (processing server, etc.), and the processing in FIGS. 7 to 11 is performed in the device. The processing result is sent from the device to the operation terminal 104 and the result is displayed on the touch panel display 105.

Although the example of operation for the printer 103 is shown as played-back device operation, data backup processing, etc., may be recorded as device operation record and operation may be played back containing it.

The invention can be applied to an art of accessing a web page and performing work.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   a display control unit that controls display on a display unit;
   a display information acquisition unit that acquires information transmitted from a connection party connected through a communication line, the information displayed on the display unit;
   a display description determination unit that determines description displayed on the display unit;
   an operation determination unit that determines operation performed for the description displayed on the display unit, the operation containing operation of giving an information transmission command to the connection party;
   a record unit that records record description which includes both the descriptions determined by the display description determination unit and the operation determined by the operation determination unit;
   a comparison unit that makes a comparison between the record description recorded by the record unit and the information acquired by the display information acquisition unit; and
   a record description execution unit that executes the record description recorded in the record unit based on a comparison result of the comparison unit, wherein
   the record description execution unit has a function of omitting display of the description determined by the display description determination unit.

2. The information processing apparatus according to claim 1, wherein
   the record unit records description of a plurality of continuous pages and operation for the plurality of continuous pages, and
   the record description execution unit executes the operation for the plurality of continuous pages.

3. The information processing apparatus according to claim 1, wherein
   the display unit is a display of a specific terminal,
   the display description determination unit acquires internal information of the specific terminal, and
   the operation determination unit determines operation for the internal information of the specific terminal.

4. The information processing apparatus according to claim 1, wherein
   the display control unit controls display of the comparison result of the comparison unit on the display unit.

5. The information processing apparatus according to claim 1, further comprising:
   an analysis unit that analyzes the information acquired by the display information acquisition unit based on the comparison result of the comparison unit, wherein
   the record description execution unit executes the record description recorded in the record unit based on a analysis result in the analysis unit.

6. The information processing apparatus according to claim 1, wherein
   the comparison is made based on a part of the information transmitted from the connection party or information determining the connection party.

7. An information processing apparatus comprising:
   a display control unit that controls display on a display unit;
   a display information acquisition unit that acquires information transmitted from a connection party connected through a communication line, the information displayed on the display unit;
   a display description determination unit that determines description displayed on the display unit;
   an operation determination unit that determines operation performed for the description displayed on the display unit, the operation containing operation of giving an information transmission command to the connection party;
   a record unit that records record description which includes both the descriptions determined by the display description determination unit and the operation determined by the operation determination unit;
   a comparison unit that makes a comparison between the record description recorded by the record unit and the information acquired by the display information acquisition unit; and
   a record description execution unit that executes the record description recorded in the record unit based on a comparison result of the comparison unit, wherein
   the record description execution unit has a function of not executing a part of the operation determined by the operation determination unit.

8. An information processing method comprising:
   controlling display on display unit;
   acquiring information transmitted from a connection party connected through a communication line, the information displayed on the display unit;
   determining description displayed on the display unit;
   determining operation performed for the description displayed on the display unit, the operation containing operation of giving an information transmission command to the connection party;
   recording record description which includes both the determined description and the determined operation;
   comparing between the record description and the acquired information; and
   executing the description recorded based on a comparison result of the comparison step,
   wherein the executing the description comprises at least one of:
      omitting display of the determined description, and
      not executing a part of the determined operation.

* * * * *